United States Patent
Calendrille, Jr.

[11] Patent Number: 5,540,118
[45] Date of Patent: Jul. 30, 1996

[54] FLEXIBLE BICYCLE DERAILLEUR COVER FOR PROTECTION AGAINST CONTAMINANTS SUCH AS MUD

[76] Inventor: John L. Calendrille, Jr., 11 Keswick La., Plainview, N.Y. 11803

[21] Appl. No.: 239,597

[22] Filed: May 9, 1994

[51] Int. Cl.$^6$ .................................................. F16P 1/00
[52] U.S. Cl. .................................... 74/608; 474/144
[58] Field of Search ................... 74/608–615, 473; 474/144

[56] References Cited

U.S. PATENT DOCUMENTS

| | | | |
|---|---|---|---|
| 947,651 | 1/1910 | Schreiber | 74/512 |
| 2,773,398 | 12/1956 | Swain | 74/473 |
| 3,184,993 | 5/1965 | Swenson . | |
| 3,896,679 | 7/1975 | Huret et al. | 474/144 |
| 3,903,751 | 9/1975 | Dian | 474/144 |
| 3,910,136 | 10/1975 | Tuy | 74/612 |
| 3,973,447 | 8/1976 | Nagano | 474/144 |
| 4,237,743 | 12/1980 | Nagano | 474/144 X |
| 4,276,786 | 7/1981 | Langenstein . | |
| 4,471,851 | 9/1984 | Kamiya et al. | 474/144 X |
| 4,507,105 | 3/1985 | Stottmann et al. . | |
| 4,573,950 | 3/1986 | Nagano | 474/144 X |
| 4,581,265 | 4/1986 | Follette . | |
| 4,813,913 | 3/1989 | Belter . | |
| 4,905,541 | 3/1990 | Alan . | |

FOREIGN PATENT DOCUMENTS

| | | | |
|---|---|---|---|
| 3518798 | 11/1985 | Germany | 474/144 |
| 6-144341 | 5/1994 | Japan | 474/144 |

OTHER PUBLICATIONS

Mavic, News 94—Advertising Brochure (undated).

*Primary Examiner*—Vinh T. Luong
*Attorney, Agent, or Firm*—Richard M. Goldberg

[57] ABSTRACT

A protective cover for a derailleur of a bicycle including a frame, a plurality of sprockets mounted to the frame, an endless chain in meshing engagement with one front sprocket and one rear sprocket, and a cable for actuating the derailleur, the derailleur being mounted to the frame in association with the sprockets and including a cage assembly for moving the endless chain from one sprocket to another sprocket, a controller for actuating the cage assembly to control the latter to move the chain from one sprocket to another sprocket and a derailleur clamping assembly for clamping the derailleur to the bicycle frame, with the cable being connected with the controller of the derailleur for actuating the controller, the protective cover includes a main body for wrapping around the controller to inhibit entry of contaminants to the controller, the main body being made of a flexible material and including side walls forming an enclosure for receiving the controller therein, the side walls being connected together so as to form first and second opposing edges, a controller securing assembly for securing together the first and second opposing edges about the controller so as to permit movement of the controller, and at least one cable opening for receiving the cable therethrough for connection with the controller; and a main body securing assembly for securing the main body to the bicycle frame or the derailleur clamping assembly of the derailleur.

21 Claims, 9 Drawing Sheets

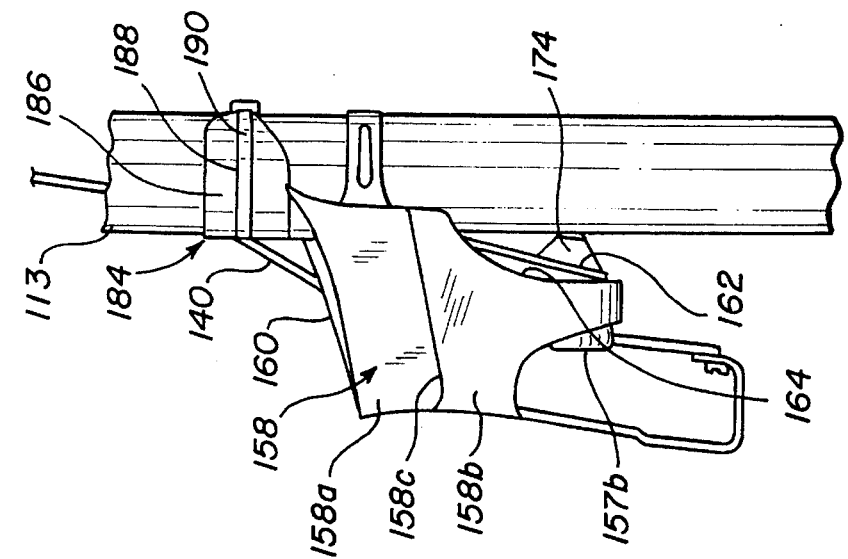
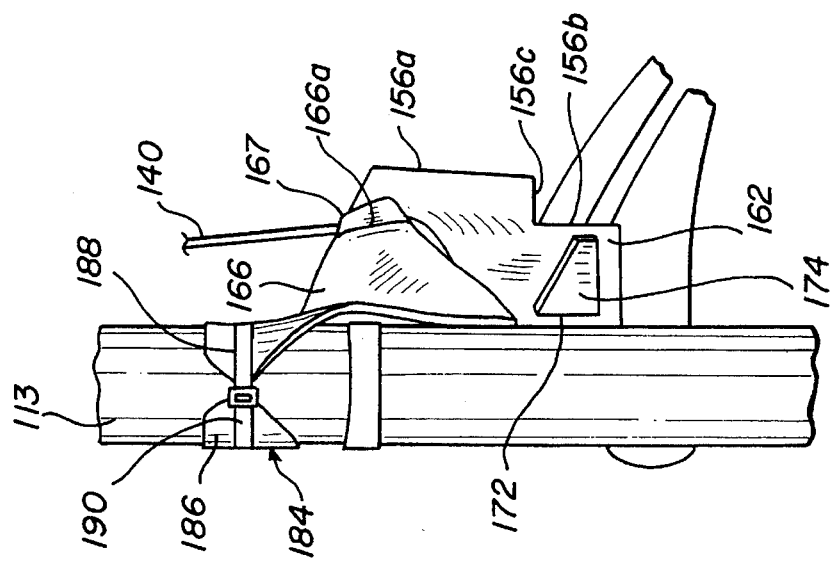
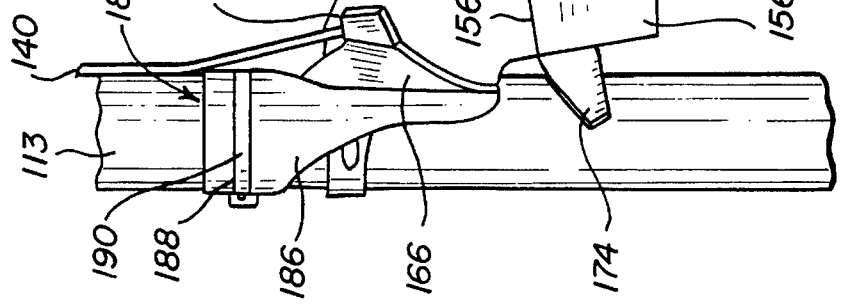

5,540,118

FLEXIBLE BICYCLE DERAILLEUR COVER FOR PROTECTION AGAINST CONTAMINANTS SUCH AS MUD

BACKGROUND OF THE INVENTION

The present invention relates generally to bicycle derailleurs, and more particularly, is directed to flexible covers for bicycle derailleurs to protect the same from contaminants such as mud.

In order to provide different gear ratios during pedaling, a plurality of different sized chain sprockets are mounted for rotation along the axes of the rear hub and the pedal shaft of the bicycle. Typically, there are two or three different sized chain sprockets, known as chain rings, rotatable along the axis of the pedal shaft, and six or seven different sized chain sprockets, known as freewheel cogs, mounted in spaced relation on a free wheel and rotatable along the axis of the rear hub. The number of available gear ratios increases with the number of chain rings and cogs that are provided. The cogs (and chain rings) are spaced apart from each other, with the largest diameter ones to the inside (or outside) and the others decreasing in diameter toward the outside (or inside).

Because there are a plurality of different sized freewheel cogs associated with the rear wheel hub and a plurality of chain rings associated with the pedal shaft, it is necessary to move the chain from one freewheel cog to another and/or from one chain ring to another, to change gears. This operation is performed by a front derailleur associated with the chain rings and a rear derailleur associated with the free wheels, and particularly, with the chain at such positions.

A conventional front derailleur includes a clamping assembly which clamps the derailleur to the seat tube of the bicycle, a cage assembly which moves the chain from one chain ring to another, and a controller which connects the cage assembly to the clamping assembly and which, more importantly, controls movement of the cage assembly to control the latter to move the chain from one chain ring to another.

Specifically, the controller includes an upper pivot head fixed to the clamping assembly, and inner and outer spaced apart pivot bars, each pivotally connected at its upper end to the upper pivot head. The lower end of the inner pivot bar is pivotally connected with the inner cage plate of the cage assembly, and the lower end of the outer pivot bar is pivotally connected with a cross bar of the cage assembly. A return spring is provided around the lower pivot pin of the inner pivot bar to normally bias the cage assembly inwardly of the bicycle. Further, a pivot bar extension extends from the pivoted end of the inner or outer pivot bar, and a cable is secured thereto. The cable extends to a gear shift lever on the bicycle. When the cable is pulled, the pivot bars pivot outwardly against the force of the return spring so as to move the cage assembly outwardly in order to move the chain. The cable can be connected to the extension from below, in which case the derailleur is a bottom pull front derailleur and the pivot bar extension extends from the pivoted end of the outer pivot bar, or from above, in which case the derailleur is a top pull front derailleur and the pivot bar extension extends from the pivoted end of the inner pivot bar.

A conventional rear derailleur includes a clamping assembly which secures the rear derailleur to a rear drop-out or rear axle holder of the frame of the bicycle, a chain cage which moves the chain from one cog to another, and a controller which connects the chain cage to the clamping assembly and which, more importantly, actuates the chain cage to control the latter to move the chain from one cog to another.

Specifically, the clamping assembly includes a clamping head through which a bolt extends for securing the rear derailleur to a rear drop-out or rear axle holder of the frame.

The chain cage includes two parallel, spaced apart cage plates. The inner and outer cage plates are connected together at the proximal end by a pivot shaft having a jockey pulley rotatably mounted thereon between the cage plates, and are connected together at the distal end by a pivot shaft having an idler pulley rotatably mounted thereon between the cage plates.

The controller includes an upper pivot head having the clamping head formed as an integral extension thereof. Inner and outer spaced apart pivot bars are pivotally connected at their upper ends by pivot pins to the upper pivot head. The lower ends of the inner and outer pivot bars are pivotally connected by pivot pins to an inwardly extending lower pivot head, and a spring is provided about a lower pivot pin to normally bias the lower pivot head outwardly of the bicycle relative to upper pivot head. The lower pivot head is fixed to the proximal end of the outer cage plate.

Further, a pivot bar extension extends inwardly from a midpoint of the outer pivot bar, and a cable is secured thereto by a cable anchor bolt thereat. The cable extends upwardly through a guide bore as an extension of the upper pivot head, to a gear shift lever on the bicycle.

When the cable is pulled up, the pivot bars pivot inwardly against the force of the return spring so as to move the chain cage inwardly of the bicycle, thereby moving the chain from one cog to another.

However, a problem that occurs in many situations, and particularly when racing bicycles in muddy conditions, is that mud and other grit cake onto the controller of the front and/or rear derailleur. Another problem is in cold conditions where water freezes onto the controller. As a result, the moving parts of the controller may become inoperable or damaged, or at least, the performance may be severely degraded. The moving parts include the pivot bars, pivot or bearing assemblies which pivotally mount the pivot bars, and the return spring. Further, even if the controller is operable, it may wear faster, requiring more frequent replacement. This is because the mud and grit act like sandpaper and cut into the bearing surfaces, causing premature wear which translates into play or slop in the mechanism. Still further, because of such mud and other grit, it is necessary to constantly clean the derailleurs, which is time-consuming and burdensome.

Although various rear derailleur guards are known which are positioned to the outside of the outer cage plate to protect the cage plates of a rear derailleur from impact, such as disclosed in U.S. Pat. No. 3,184,993 to Swenson and U.S. Pat. No. 4,905,541 to Alan, these guards do nothing to prevent mud and other grit from clogging operation of the derailleur controller. Further, bicycle chain guards which protect the chain are known from U.S. Pat. No. 4,507,105 to Stottmann et al.

Although various boots are known for machinery parts, none of these boots are used for bicycle derailleurs and are therefore configured very differently. For example, see U.S. Pat. No. 4,276,786 to Langenstein with respect to earth moving vehicles and the like. See also U.S. Pat. No. 4,581,265 to Follette and U.S. Pat. No. 4,813,913 to Belter.

OBJECTS AND SUMMARY OF THE INVENTION

Accordingly, it is an object of the present invention to provide a flexible bicycle derailleur cover that overcomes the problems with the aforementioned prior art.

It is another object of the present invention to provide a flexible bicycle derailleur cover that substantially prevents the deposit of mud and other grit onto the controller of the derailleur, and prevents water from freezing on the controller of the derailleur.

It is still another object of the present invention to provide a flexible bicycle derailleur cover that inhibits premature wear of the controller of the derailleur.

It is yet another object of the present invention to provide a flexible bicycle derailleur cover that maintains the controller in a substantially clean condition at all times.

In accordance with an aspect of the present invention, a protective cover is provided for a derailleur of a bicycle including a frame, a plurality of sprockets mounted to the frame, an endless chain in meshing engagement with one front sprocket and one rear sprocket, and a cable for actuating the derailleur, the derailleur being mounted to the frame in association with the sprockets and including cage means for moving the endless chain from one sprocket to another sprocket, controller means for actuating the cage means to control the latter to move the chain from one sprocket to another sprocket and derailleur clamping means for clamping the derailleur to the bicycle frame, with the cable being connected with the controller means of the derailleur for actuating the controller means, the protective cover comprising main body means for wrapping around the controller means to inhibit entry of contaminants to the controller means, the main body means being made of a flexible material, the main body means including side walls forming an enclosure for receiving the controller means therein, the side walls being connected together so as to form first and second opposing edges, controller securing means for securing together the first and second opposing edges about the controller means so as to permit movement of the controller means, and at least one cable opening means for receiving the cable therethrough for connection with the controller means; and main body securing means for securing the main body means to the bicycle frame or the derailleur clamping means.

Specifically, the side walls include outer side wall means for covering an outer side of the controller means, opposite end wall means, connected at opposite side edges of the outer side wall means, for covering opposite ends of the controller means, and at least one rear wall means, connected to one side edge of at least one opposite end wall means, for covering an inner side of the controller means.

The main body means further includes top wall means, connected with upper edges of at least one of the outer side wall means, the end wall means and the rear wall means, for covering a top of the controller means.

With respect to use with a front derailleur, the at least one rear wall means is formed by opposing first rear flaps connected to rear edges of the end wall means, respectively, and extending inwardly of the main body means, and the controller securing means is connected with at least one of the first rear flaps. Preferably, the controller securing means includes a slit-like opening in one end wall means or one first rear flap, and tab means in the opposite rear flap for engagement within the slit-like opening.

Preferably, each first rear flap is connected to a lower portion of the respective end wall means, and a second rear flap is connected above a respective lower rear flap and to one end wall means and/or the top wall, and the at least one cable opening means is defined between the second rear flap and the respective first rear flap. The second rear flap and the first rear flap that define the cable opening means are preferably in at least partially overlapping relation to each other.

*The main body means further includes first overlapping bottom flaps connecting together bottom edges of each adjoining end wall and first or lower rear flap. The main body means further includes second bottom flaps extending inwardly of the main body means from a lower edge of each end wall, and spaced outwardly of the bicycle with respect to the first bottom flaps.

With respect to a front derailleur, the bicycle frame includes a seat tube, and said main body securing means includes an arcuate section for wrapping about the seat tube, the top wall being secured to an outer surface of the arcuate section; and arcuate section clamping means for securing the arcuate section about the seat tube. Preferably, the arcuate section includes a groove therein which is transverse to a longitudinal axis of the seat post, and the arcuate section clamping means includes a clamping strap extending in the groove and wrapping about the seat post to secure the arcuate section to the seat post.

In addition, with respect to a bottom pull front derailleur, the controller means includes first and second pivoting members, each pivotally connected at an upper pivot end adjacent the clamping means and pivotally connected to the cage means at a lower pivot end thereof, one pivoting member having an extension, and the cable being connected with the extension for actuating the controller means, and one end wall means is raised to a greater height than the other the end wall means such that the main body means defines a raised cavity portion adjacent the one raised end wall means for receipt of the extension therein.

In the case of a rear derailleur, the at least one rear wall means includes a single rear wall connected at one edge with one end wall means, and the main body means further includes side flap means connected with an opposite side edge of the single rear wall, and the controller securing means is connected with the side flap and the other end wall means.

Further, the controller securing means includes a slit-like opening in one side flap or the other the end wall means, and tab means in the other of the side flap and the other end wall means.

In the case of a rear derailleur, it includes an upper pivot head, a lower pivot head, first and second pivoting members, each pivotally connected at an upper pivot end to the upper pivot head and at a lower pivot end to the lower pivot head, with the cage means being connected with the lower pivot head, the derailleur clamping means includes a clamping head extending from the upper pivot head, and the main body securing means includes a bulbous portion connected with the main body means and securable about the clamping head and upper pivot head. In such case, the cable opening means is defined between the bulbous portion and upper edges of the side walls. Further, the bulbous portion is open at a rear portion thereof to permit securement of the derailleur clamping means to the frame.

Also, the cover includes lower pivot head cover means for covering the lower pivot head. The lower pivot head cover means includes a generally cylindrical wall connected with lower edges of selected ones of the side walls and provided in surrounding relation to the lower pivot head cover means.

In accordance with another aspect of the present invention, a protective cover is provided for a front derailleur of a bicycle, the bicycle including a frame, a plurality of sprockets mounted to the frame, an endless chain in meshing engagement with one front sprocket and one rear sprocket, and a cable for actuating the derailleur, the front derailleur being mounted to the frame in association with the sprockets and including cage means for moving the endless chain from one sprocket to another sprocket, controller means for actuating the cage means to control the latter to move the chain from one sprocket to another sprocket and derailleur clamping means for clamping the derailleur to the bicycle frame, and the controller means including first and second pivoting members, each pivotally connected at an upper pivot end adjacent the clamping means and pivotally connected to the cage means at a lower pivot end thereof, one pivoting member having an extension, and the cable being connected with the extension for actuating the controller means, and the protective cover includes main body means for wrapping around the controller means to inhibit entry of contaminants to the controller means, the main body means being made of a flexible material, the main body means including side walls forming an enclosure for receiving the controller means therein, the side walls being connected together so as to form first and second opposing edges, controller securing means for securing together the first and second opposing edges about the controller means so as to permit movement of the controller means, and at least one cable opening means for receiving the cable therethrough for connection with the controller means; and main body securing means for securing the main body means to the bicycle frame or the derailleur clamping means.

In accordance with still another aspect of the present invention, a protective cover is provided for a rear derailleur of a bicycle, the bicycle including a frame, a plurality of sprockets mounted to the frame, an endless chain in meshing engagement with one front sprocket and one rear sprocket, and a cable for actuating the derailleur, the rear derailleur being mounted to the frame in association with the sprockets and including cage means for moving the endless chain from one sprocket to another sprocket, controller means for actuating the cage means to control the latter to move the chain from one sprocket to another sprocket and derailleur clamping means for clamping the derailleur to the bicycle frame, and the controller means including an upper pivot head, a lower pivot head, first and second pivoting members, each pivotally connected at an upper pivot end to the upper pivot head and at a lower pivot end to the lower pivot head, with the cage means being connected with the lower pivot head, one the pivoting member having an extension, and the cable being connected with the extension for actuating the controller means, and the derailleur clamping means includes a clamping head extending from the upper pivot head, and the protective cover including main body means for wrapping around the controller means to inhibit entry of contaminants to the controller means, the main body means being made of a flexible material, the main body means including side walls forming an enclosure for receiving the controller means therein, the side walls being connected together so as to form first and second opposing edges, controller securing means for securing together the first and second opposing edges about the controller means so as to permit movement of the controller means, and at least one cable opening means for receiving the cable therethrough for connection with the controller means; and main body securing means for securing the main body means to the bicycle frame or the derailleur clamping means.

The above and other objects, features and advantages of the invention will become readily apparent from the following detailed description thereof which is to be read in connection with the accompanying drawings.

BRIEF DESCRIPTION OF THE DRAWINGS

FIG. 7 is a perspective view of the flexible bicycle derailleur cover of FIG. 2, in an open configuration separated from the bicycle derailleur;

FIG. 11 is right side elevational view of the flexible bicycle derailleur cover of FIG. 9;

FIG. 12 is a rear elevational view of the flexible bicycle derailleur cover of FIG. 9;

FIG. 13 is a left side elevational view of the flexible bicycle derailleur cover of FIG. 9;

DETAILED DESCRIPTION OF THE PREFERRED EMBODIMENTS

Figure 1:
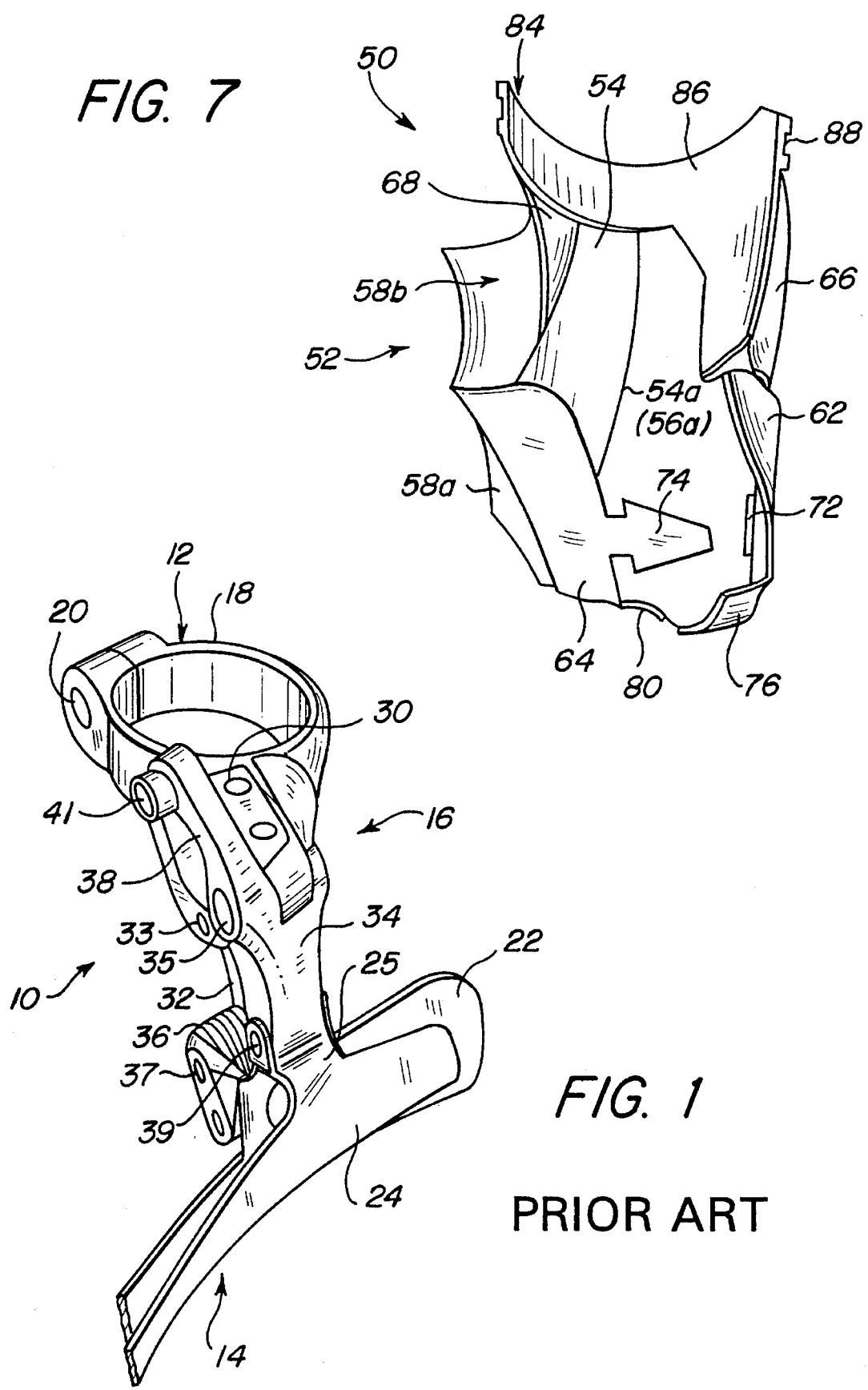
FIG. 1 is a perspective view of a bottom pull front derailleur with which the present invention can be used.

Referring to the drawings in detail, and initially to FIG. 1 thereof, a conventional bottom pull front derailleur 10 for a bicycle includes a clamping assembly 12 which clamps derailleur 10 to the seat tube 13 (FIGS. 2–6) of the bicycle, a cage assembly 14 which moves the chain from one chain ring to another and a controller 16 which connects cage assembly 14 to clamping assembly 12 and which, more importantly, actuates cage assembly 14 to control the latter to move the chain from one chain ring to another.

Specifically, clamping assembly 12 includes a clamp band 18 which is clamped about seat tube 13 and tightened thereon by a clamp bolt 20. Cage assembly 14 includes two parallel, spaced apart cage plates 22 and 24. Cage plates 22 and 24 are connected together at a proximal end by an upper cross bar 25, which is connected to controller 16, while the opposite free distal ends thereof are secured together in spaced relation by a bent end 26 (FIGS. 2–6) of cage plate 22 and a securing bolt 28.

Controller 16 includes an upper pivot head 30 fixed to clamp band 18 and inner and outer spaced apart pivot bars 32 and 34, pivotally connected at their upper ends by pivot pins or bearings 33 and 35, respectively, to upper pivot head 30. The lower end of inner pivot bar 32 is pivotally connected by a pivot pin or bearing 37 to inner cage plate 22, and the lower end of outer pivot bar 34 is pivotally connected by a pivot pin or bearing 39 to cross bar 25. A return spring 36 is provided at the lower pivoted end of inner pivot bar 32 to normally bias cage assembly 14 inwardly of the bicycle. Further, a pivot bar extension 38 extends from the upper pivoted end of outer pivot bar 34, and a cable 40 is secured thereto by a cable anchor bolt 41 thereat. Cable 40 extends to a gear shift lever (not shown) on the bicycle.

When cable 40 is pulled down, pivot bars 32 and 34 pivot outwardly against the force of return spring 36 so as to move cage assembly 14 outwardly, thereby moving the chain from one chain ring to another chain ring.

However, as discussed above, a problem that occurs in many situations, and particularly when racing bicycles in muddy conditions, is that mud and other grit cake onto controller 16. As a result, the moving parts of controller 16, such as pivot bars 32 and 34, pivot pins or bearings 33, 35, 37 and 39, and return spring 36, may become inoperable or damaged. Further, even if controller 16 is operable, it may wear faster, requiring more frequent replacement. Still further, because of such mud and other grit, it is necessary to constantly clean derailleur 10, which is time-consuming and burdensome.

In order to overcome this problem, the present invention provides a flexible bicycle derailleur cover or boot 50 which will be described in association with a bottom pull front derailleur. As will be described hereinafter in greater detail, controller 16 is wrapped by cover or boot 50, so that controller 16 is covered along all of its sides, its bottom and its top, in order to prevent mud and other grit from entering and fouling controller 16.

Specifically, cover 50 is preferably made of a one-piece neoprene rubber material that can wrap about controller 16, although any other suitable flexible material can be used. It is important that cover 50 be flexible so as to permit movement of pivot bars 32 and 34 and cage assembly 14 when cover 50 is wrapped about controller 16. In other words, it is important that cover 50 be made of a rubber or similar material, so as not to hinder the movement of the cage plates 22 and 24, and thereby, not affect the operation of the derailleur.

Cover 50 includes a main body 52 for wrapping around controller 16 to inhibit entry of contaminants to controller 16, and particularly, to the moving parts thereof. Main body 52 is made of a flexible, resilient material, such as neoprene rubber, to enable movement of controller 16 and cage assembly 14 in their normal operations.

Although main body 52 will now be discussed as including various walls, it will be appreciated that main body 52 is preferably formed as a unitary, integral structure, and the discussion of the different walls is made only to facilitate understanding of the invention, and in fact, many of the various walls merge into each other. Further, it will be appreciated that the exact placement of the walls can be changed within the scope of the invention as defined by the appended claims.

Main body 52 includes a front wall 54 for covering an outer side of controller 16, opposite end walls 56 and 58 connected with front wall 54 for covering opposite ends of controller 16, a top wall 60 connecting together upper edges of front wall 54 and opposite end walls 56 and 58, and opposing lower rear flaps 62 and 64 connected to lower rear edges of end walls 56 and 58, respectively, and extending inwardly of main body 52 toward each other.

Figure 2:
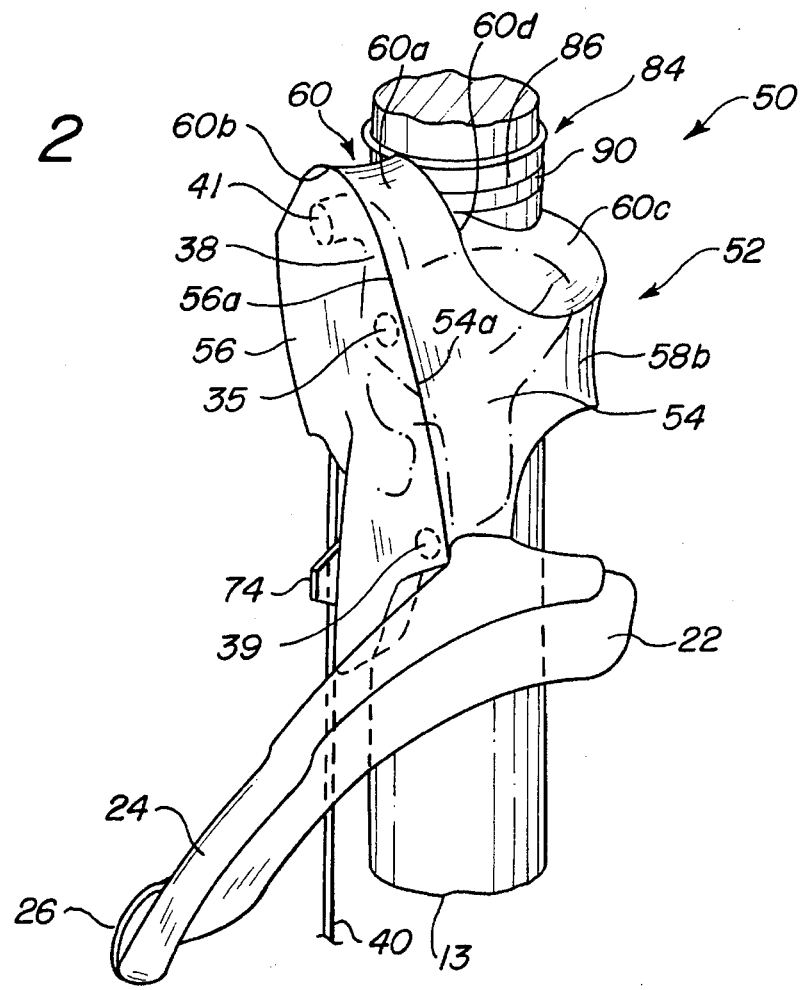
FIG. 2 is a front and left side perspective view of a flexible bicycle derailleur cover according to one embodiment of the present invention, for use with the bottom pull front derailleur of FIG. 1.
Figure 4:
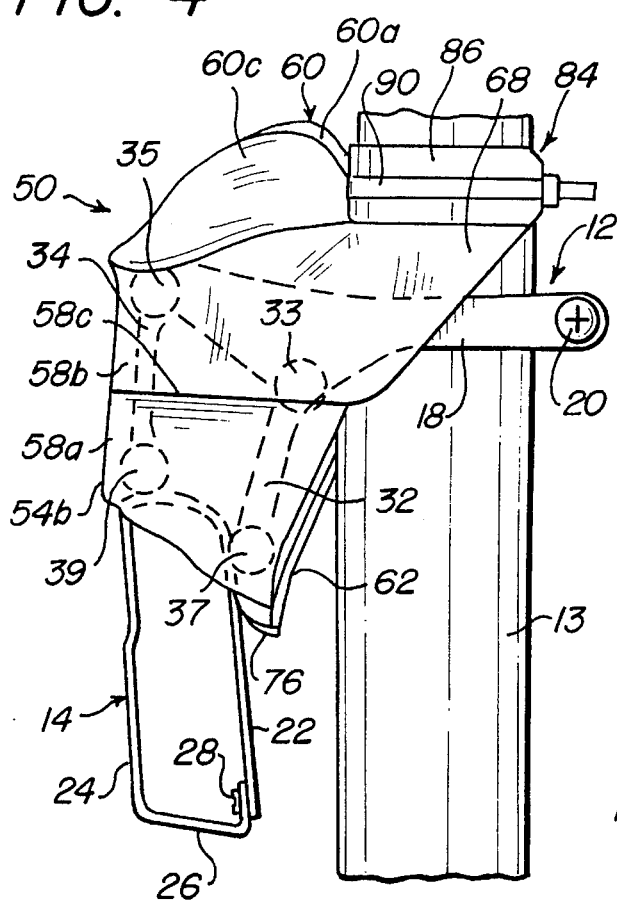
FIG. 4 is right side elevational view of the flexible bicycle derailleur cover of FIG. 2.
Figure 5:
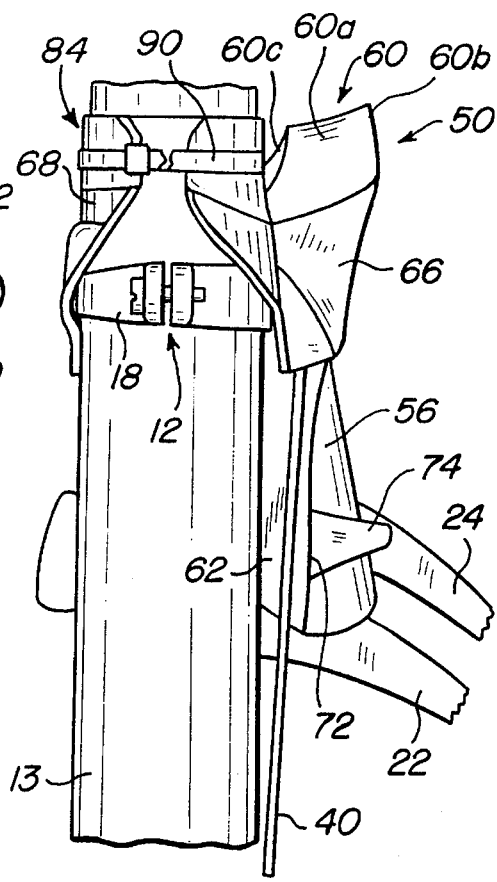
FIG. 5 is a rear elevational view of the flexible bicycle derailleur cover of FIG. 2.
Figure 6:
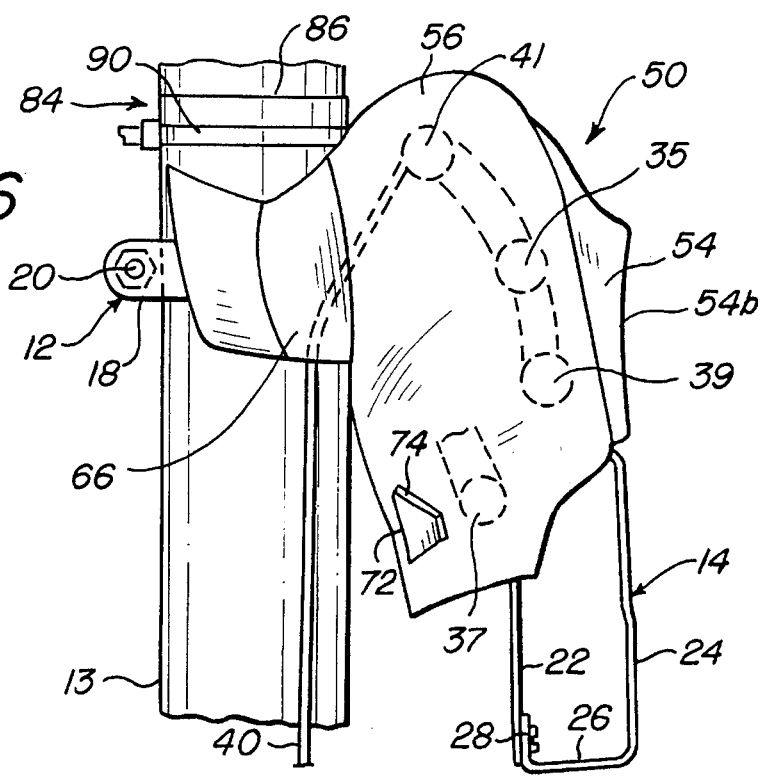
FIG. 6 is a left side elevational view of the flexible bicycle derailleur cover of FIG. 2.
Figure 14:
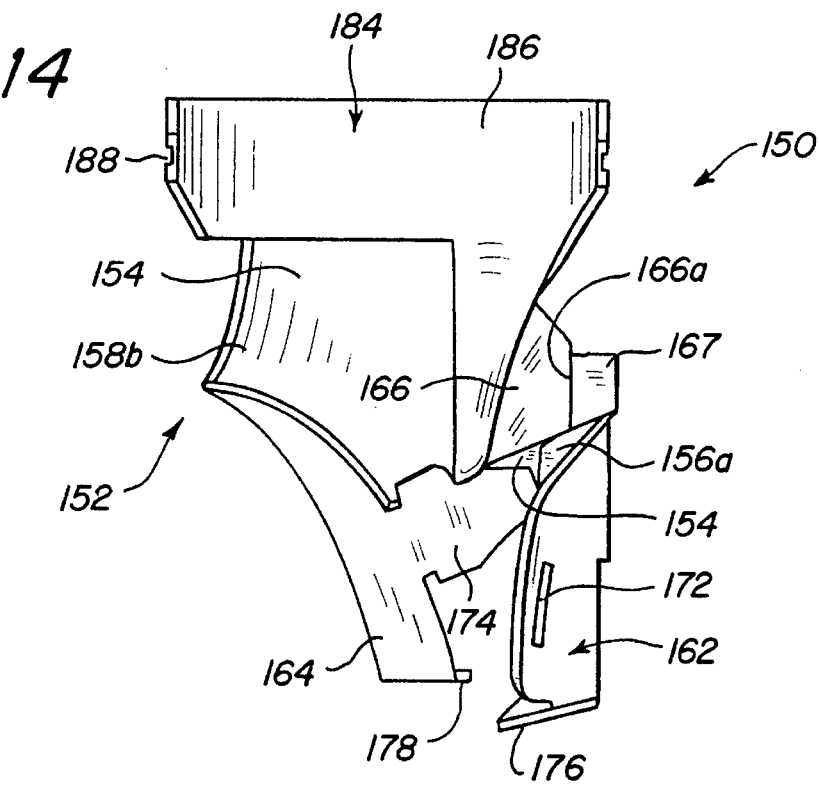
FIG. 14 is a perspective view of the flexible bicycle derailleur cover of FIG. 9, in an open configuration separated from the bicycle derailleur.

In the preferred embodiment, end wall 56 is formed as a substantially planar wall having a generally inverted U-shaped configuration, as best shown in FIGS. 2 and 6. End wall 58, on the other hand, is formed from a lower vertically arcuate section 58a having an outward concavity and an upper horizontally arcuate section 58b having an outward convexity, upper horizontally arcuate section 58b being connected with lower vertically arcuate section 58a along a slightly arcuate, horizontal line 58c. Outer front wall 54 is connected at one edge 54a thereof to an edge 56a of end wall 56, as best shown in FIGS. 2 and 7. A lower portion of the opposite edge 54b of outer front wall 54 is connected with a vertical edge of lower vertically arcuate section 58a, as best shown in FIGS. 4 and 6, so as to form a continuation of horizontal line 58c and being generally transverse thereto, while the upper portion of the opposite edge of front wall 54 merges into upper horizontally arcuate section 58b in a continuous manner. It will be appreciated that end wall 56 extends to a higher position than upper horizontally arcuate section 58b so as to form a raised portion of cover 10 which receives extension 38 therein and permits pivoting movement thereof.

Top wall 60 is formed in two parts. A first top wall part 60a forms a continuation of the upper end of front wall 54 and extends in a hill or bump configuration, with one edge 60b connected with the upper edge of end wall 56, as best shown in FIG. 2. As also shown in FIG. 2, a second top wall part 60c is formed in a depression configuration and is connected to the opposite edge 60d of first top wall part 60a and to the upper edge of upper horizontally arcuate section 58b of end wall 58.

Lower rear flaps 62 and 64 extend toward each other, that is, inwardly of main body 52, from free edges of end wall 56 and lower vertically arcuate section 58a of end wall 58, respectively. Upper rear flaps 66 and 68 are also provided, with upper rear flap 66 extending inwardly from the upper edge of end wall 56 immediately above and substantially parallel to lower rear flap 62, and with upper rear flap 68 extending inwardly from the free end of upper horizontally arcuate section 58b and which merges thereinto so as to form a continuation of upper horizontally arcuate section 58b. Cable 40 extends from extension 38 and to the outside of cover 50 from between lower rear flap 62 and upper rear flap 66, that is, an opening is provided therebetween for cable 40.

As a result, controller 16 can be received within main body 52, and main body can be wrapped about controller 16.

A slit-like opening 72 is formed at the lower portion of end wall 56 immediately adjacent to rear flap 62, and a tab 74 is formed at the free edge of rear flap 64 for engagement within slit-like opening 72 so as to releasably secure main body 52 about controller 16. Although tab 74 is shown in the shape of an arrow, any other suitable configuration can be used.

Main body 52 further includes a bottom flap 76 connecting together lower edges of adjoining end wall 56 and rear flap 62, and a bottom flap 78 connecting together lower edges of adjoining lower vertically arcuate section 58a and rear flap 64. When tab 74 is secured within slit-like opening 72, bottom flap 76 partially overlaps bottom flap 78.

Figure 3:
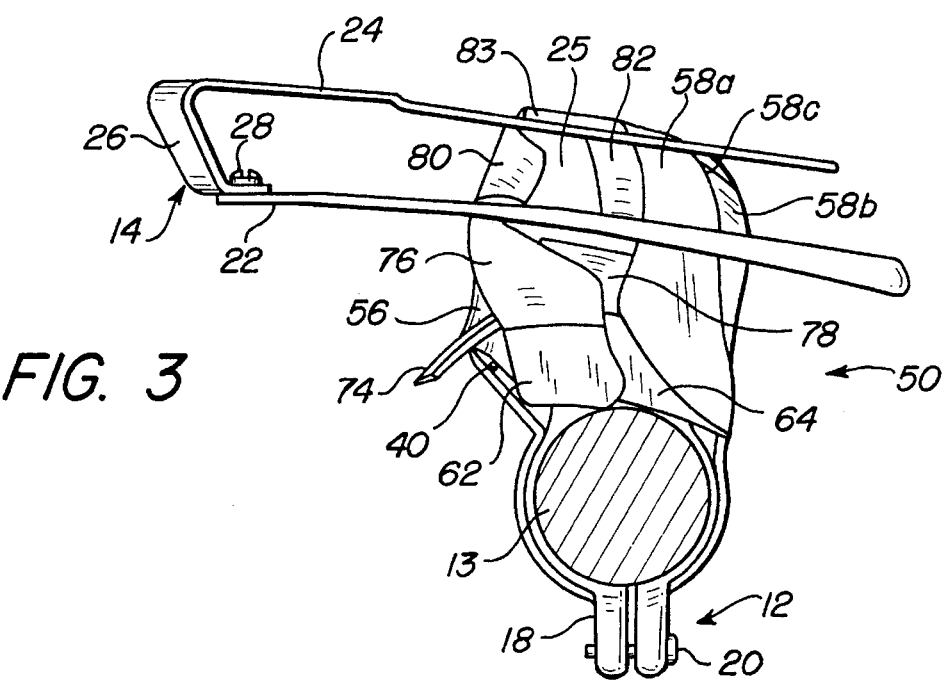
FIG. 3 is a bottom plan view of the flexible bicycle derailleur cover of FIG. 2.

Additional bottom flaps 80 and 82 extend toward each other from lower edges of end wall 56 and lower vertically arcuate section 58a, respectively, and are spaced outwardly of the bicycle with respect to bottom flaps 76 and 78, as best shown in FIG. 3.

A small rectangular bottom flap 83 extends inwardly from the lower edge of front wall 54 at a position between the lower edge of end wall 56 and the lower edge of lower vertically arcuate section 58a of end wall 58. In the assembled position, flap 83 rests on top of upper cross bar 25 to prevent access of contaminants thereto.

Cover 50 further includes a seat tube securing body 84 for securing main body 52 about seat tube 13. Seat tube securing body 84 includes an arcuate section 86 which wraps about seat tube 13, with top wall 60 being secured to the outer surface of arcuate section 86. Preferably, arcuate section 86 is made of a flexible, resilient material, such as the same neoprene rubber as main body 52, although this need not be the case since it is not essential that seat tube securing body 84 be flexible and resilient.

Preferably, arcuate section 86 includes an outer groove 88 therein which extends transverse to the longitudinal axis of seat post 13. In this regard, a clamping tie 90 is provided which extends in groove 88 and wraps about seat post 13 to secure arcuate section 86 to seat post 13. However, securement of arcuate section 86 can be by any other suitable means, such as tabs, tie wraps, "VELCRO" ties or the like. In this manner, cover 50 can be easily removed or secured onto controller 16.

Thus, a flexible bicycle derailleur cover 50 is provided for a bottom pull front derailleur that substantially prevents the deposit of mud, ice and other grit onto controller 16 of the derailleur so as to maintain controller 16 in a substantially clean condition at all times, thereby inhibiting premature wear of controller 16.

Figure 8:
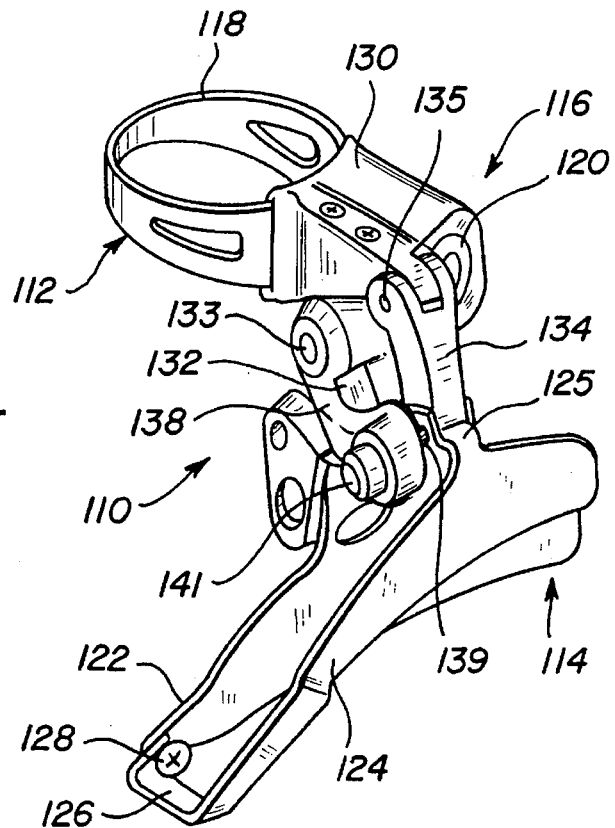
FIG. 8 is a perspective view of a top pull front derailleur with which the present invention can be used.

Referring now to FIGS. 8–14 of the drawings, and initially to FIG. 8 thereof, a conventional top pull front derailleur 110 for a bicycle is shown which is substantially identical in relevant respects to bottom pull front derailleur 10 of FIG. 1, and accordingly, the same reference numerals used in conjunction with bottom pull front derailleur 10 of FIG. 1 are used with top pull front derailleur 110 of FIG. 8, but augmented by 100. Top pull front derailleur 110 differs primarily from bottom pull front derailleur 10 by the placement of pivot bar extension 138 which extends outwardly from thee upper pivoted end of inner pivot bar 132. Cable 140 is secured to the free end of pivot bar extension 138 by cable anchor bolt 141 thereat, and extends upwardly to a gear shift lever (not shown) on the bicycle. When cable 140 is pulled up, pivot bars 132 and 134 pivot outwardly by means of pivot pins 133 and 135 which are secured to upper pivot head 130, against the force of the return spring (not shown) so as to move cage assembly 114 outwardly, thereby moving the chain from one chain ring to another chain ring. Further, the clamping assembly 112 is configured slightly differently, although it includes a clamp band 118 and clamp bolt 120.

As discussed above, a problem that occurs in many situations, and particularly when racing bicycles in muddy conditions, is that mud and other grit cake onto controller 116. As a result, the moving parts of controller 116, such as the pivot bars 132 and 134, the upper pivot pins or bearings 133, 135, the lower pivot pins or bearings (only 139 of which is shown), and the return spring (not shown), may become inoperable or damaged. Further, even if controller 116 is operable, it may wear faster, requiring more frequent replacement. Still further, because of such mud and other grit, it is necessary to constantly clean derailleur 110, which is time-consuming and burdensome.

In order to overcome this problem, the present invention also provides a flexible bicycle derailleur cover or boot 150 for use with top pull front derailleur 110. As will be described hereinafter in greater detail, controller 116 is wrapped by cover or boot 150, so that controller 116 is covered along all of its sides, its bottom and its top, in order to prevent mud, grit, ice and the like from entering and fouling controller 116.

Specifically, cover 150 is preferably made of a one-piece neoprene rubber material that can wrap about controller 116, although any other suitable flexible material can be used, such as a sturdy fabric or the like. It is important that cover 150 be flexible so as to permit movement of pivot bars 132 and 134 and cage assembly 114 when cover 150 is wrapped about controller 116. In other words, it is important that cover 150 be made of a rubber or similar material, so as not to hinder the movement of the inner and outer cage plates 122 and 124, and thereby, not affect the operation of the derailleur. As a side note, it will be appreciated that cage plates 122 and 124 are connected together at their proximal ends by an upper cross bar 125, which is connected to controller 116, while the opposite free distal ends thereof are secured together in spaced relation by a bent end 126 (FIG. 8) of cage plate 124 and a securing bolt 128.

Cover 150 includes a main body 152 for wrapping around controller 116 to inhibit entry of contaminants to controller 116, and particularly, to the moving parts thereof. Main body 152 is made of a flexible, resilient material, such as neoprene rubber, to enable movement of controller 116 and cage assembly 114 in their normal operations.

Although main body 152 will now be discussed as including various walls, it will be appreciated that main body 152 is preferably formed as a unitary, integral structure, and the discussion of the different walls is made only to facilitate understanding of the invention, and in fact, many of the various walls merge into each other. Further, it will be appreciated that the exact placement of the walls can be changed within the scope of the invention as defined by the appended claims.

Main body 152 includes a front wall 154 for covering an outer side of controller 116, opposite end walls 156 and 158 connected with front wall 154 for covering opposite ends of controller 116, a top wall 160 connecting together upper edges of front wall 154 and opposite end walls 156 and 158, and opposing lower rear flaps 162 and 164 connected to lower rear edges of end walls 156 and 158, respectively, and extending inwardly of main body 152 toward each other.

Figure 9:
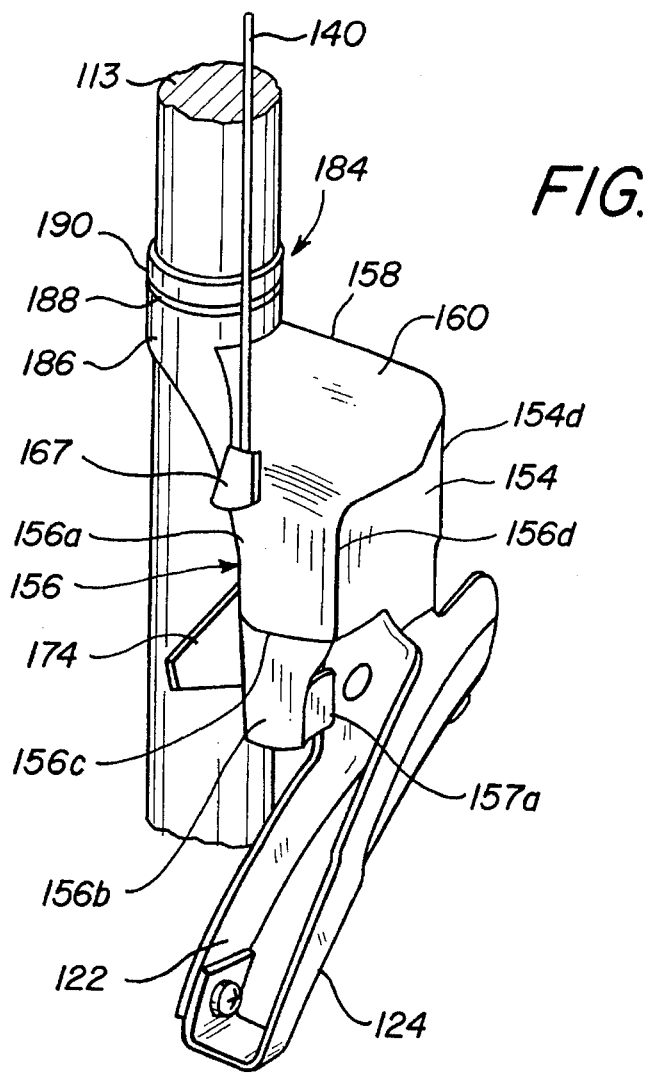
FIG. 9 is a front and left side perspective view of a flexible bicycle derailleur cover according to one embodiment of the present invention, for use with the top pull front derailleur of FIG. 8.
Figure 10:
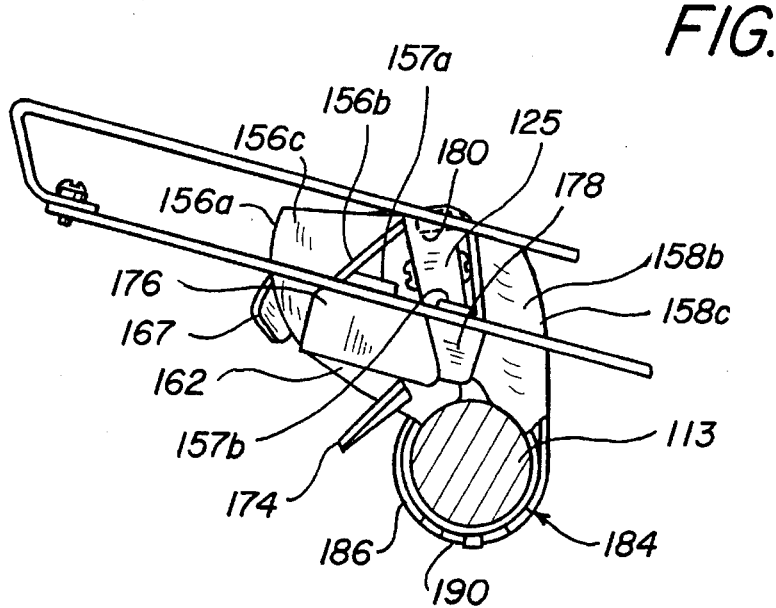
FIG. 10 is a bottom plan view of the flexible bicycle derailleur cover of FIG. 9.

In the preferred embodiment, end wall 156 is formed from an upper, generally vertical section 156a and a lower, generally vertical section 156b spaced inwardly of upper section 156a and connected thereto by a substantially horizontally oriented triangular shoulder 156c, as best shown in FIGS. 9, 10 and 13. End wall 158, on the other hand, is formed from an upper horizontally arcuate section 158a having an outward convexity and a lower vertically arcuate section 158b having an outward concavity, with upper horizontally arcuate section 158a being connected with lower vertically arcuate section 158b along a slightly arcuate, horizontal line 158c. Lower vertically arcuate section 158b extends to a higher position of controller 116 than lower vertical section 156b. Outer front wall 154 is connected at one side edge 154a thereof to an edge 156d of upper section 156a of end wall 156, as best shown in FIGS. 9 and 13. A lower portion of the opposite side edge 154b of outer front wall 154 is connected with a vertical edge of lower vertically arcuate section 158b, as best shown in FIGS. 9 and 11, so as to form a continuation of horizontal line 158c and being generally transverse thereto, while the upper portion of the opposite edge of front wall 154 merges into upper horizontally arcuate section 158a in a continuous manner.

First and second small flaps 157a and 157b extend toward each other from outer or front edges of lower vertical section 156b and lower vertically arcuate section 158b, respectively, as shown best in FIGS. 9 and 10.

Top wall 160 forms a bent horizontal continuation of the upper end of upper section 156a of end wall 156 and is connected to the upper edge of upper horizontally arcuate section 158a of end wall 158 and to the upper edge of front wall 154, as best shown in FIG. 9.

Lower rear flaps 162 and 164 extend toward each other, that is, inwardly of main body 152, from free edges of upper and lower vertical sections 156a and 156b of end wall 156 and lower vertically arcuate section 158b of end wall 158, respectively. An upper rear flap 166 is also provided, with upper rear flap 166 being connected to a side edge 160a of top wall 160, immediately inwardly or behind the connection of top wall 160 with upper vertical section 156a of end wall 156, and extending downwardly therefrom. The outer free side edge 166a of upper rear flap 166 is provided with a bent flap 167 that rests on top of upper section 156a of end wall 156 in the assembled configuration. A top pull cable 140 extends from extension 138 and to the outside of cover 150 from an opening between upper section 156a of end wall 156 and upper rear flap 166, and particularly, bent flap 167 thereof. As a result, bent flap 167 functions as a roof or cover to deflect water and other contaminants from entering cover 150.

As a result, controller 116 can be received within main body 152 so that main body can be wrapped about controller 116.

A slit-like opening 172 is formed in rear flap 162, and a tab 174 is formed at the free edge of rear flap 164 for engagement within slit-like opening 172 so as to releasably secure main body 152 about controller 116. Although tab 174 is shown in the shape of an arrow, any other suitable configuration can be used.

Main body 152 further includes a bottom flap 176 connecting together lower edges of adjoining lower section 156b of end wall 156 and rear flap 162, and a bottom flap 178 connecting together lower edges of adjoining lower vertically arcuate section 158b and rear flap 164. When tab 174 is secured within slit-like opening 172, bottom flap 176 partially overlaps bottom flap 178.

A small rectangular bottom flap 180 extends inwardly from the lower edge of front wall 154 at a position between lower arcuate section 156b of end wall 156 and lower vertically arcuate section 158b of end wall 158. In the assembled position, flap 180 rests on top of upper cross bar 125 to prevent access of contaminants thereto.

Cover 150 further includes a seat tube securing body 184 for securing main body 152 about seat tube 113. Seat tube securing body 184 includes an arcuate section 186 which wraps about seat tube 113, with top wall 160 and the opposite side edge of upper rear flap 166 being secured to the outer surface of arcuate section 186. Preferably, arcuate section 186 is made of a flexible, resilient material, such as the same neoprene rubber as main body 152, although this need not be the case since it is not essential that seat tube securing body 184 be flexible and resilient.

Preferably, arcuate section 186 includes an outer groove 188 therein which extends transverse to the longitudinal axis of seat post 113. In this regard, a clamping tie 190 is provided which extends in groove 188 and wraps about seat post 113 to secure arcuate section 186 to seat post 113. However, securement of arcuate section 186 can be by any other suitable means, such as tabs, tie wraps, "VELCRO" ties or the like. In this manner, cover 150 can be easily removed or secured onto controller 116.

Thus, a flexible bicycle derailleur cover 150 is provided for a top pull front derailleur that substantially prevents the deposit of mud, ice and other grit onto controller 116 of the derailleur so as to maintain controller 116 in a substantially clean condition at all times, thereby inhibiting premature wear of controller 116.

Figure 15:
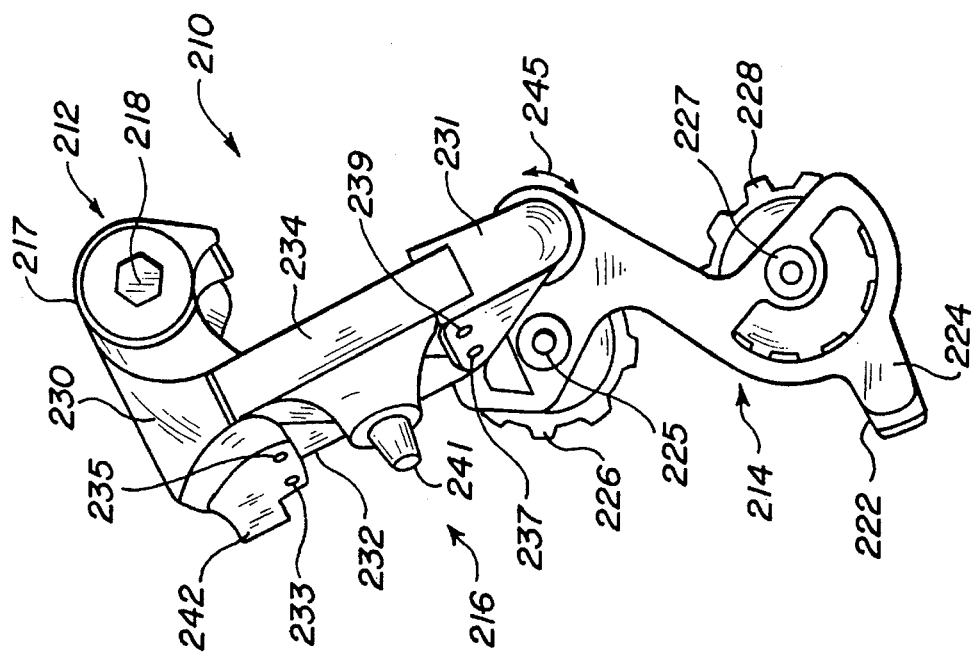
FIG. 15 is a perspective view of a rear derailleur with which the present invention can be used.

Referring now to FIGS. 15–21 of the drawings, and initially to FIG. 15 thereof, a conventional rear derailleur 210 for a bicycle is shown. Specifically, rear derailleur 210 includes a clamping assembly 212 which secures rear derailleur 210 to a rear drop-out or rear axle holder (not shown) of the frame of the bicycle, a chain cage 214 which moves the chain from one cog to another, and a controller 216 which connects chain cage 214 to clamping assembly 212 and which, more importantly, actuates chain cage 214 to control the latter to move the chain from one cog to another.

Specifically, clamping assembly 212 includes a clamping head 217 through which a bolt 218 extends for securing rear derailleur 210 to a rear drop-out or rear axle holder of the frame.

Chain cage 214 includes inner and outer parallel, spaced apart cage plates 222 and 224. Inner and outer cage plates 222 and 224 are connected together at the proximal end by a pivot shaft 225 having a jockey pulley 226 rotatably mounted thereon between cage plates 222 and 224, and are connected together at the distal end by a pivot shaft 227 having an idler pulley 228 rotatably mounted thereon between cage plates 222 and 224.

Controller 216 includes an upper pivot head 230 having clamping head 217 formed as an integral extension thereof. Inner and outer spaced apart pivot bars 232 and 234 are pivotally connected at their upper ends by pivot pins 233 and 235, respectively, to upper pivot head 230. The lower ends of inner and outer pivot bars 232 and 234 are pivotally connected by pivot pins 237 and 239 to a lower pivot head 231, and a spring (not shown) is provided about pivot pin 237 to normally bias lower pivot head 231 outwardly of the bicycle relative to upper pivot head 230. Lower pivot head 231 is rotatably secured to the proximal end of outer cage plate 224 so as to be capable of rotation in the direction of arrow 245.

Further, a pivot bar extension 238 extends inwardly from a midpoint of outer pivot bar 234, and a cable 240 is secured thereto by a cable anchor bolt 241 thereat. Cable 240 extends upwardly through a guide bore 242 as an extension of upper pivot head 230, to a gear shift lever (not shown) on the bicycle.

When cable 240 is pulled up, pivot bars 232 and 234 pivot inwardly against the force of the return spring so as to move chain cage 214 inwardly of the bicycle, thereby moving the chain from one cog to another.

As discussed above, a problem that occurs in many situations, and particularly when racing bicycles in muddy conditions, is that mud and other grit cake onto controller 216. As a result, the moving parts of controller 216, such as pivot bars 232 and 234, pivot pins 233, 235, 237 and 239, the return spring (not shown) and the pivoting connection of lower pivot head 231 to outer cage plate 224, may become inoperable or damaged. Further, even if controller 216 is operable, it may wear faster, requiring more frequent replacement. Still further, because of such mud and other grit, it is necessary to constantly clean derailleur 210, which is time-consuming and burdensome.

In order to overcome this problem, the present invention provides a flexible bicycle derailleur cover or boot 250 for use with rear derailleur 210. As will be described hereinafter in greater detail, controller 216 is wrapped by cover or boot 250, so that controller 216 is covered along all of its sides, its bottom and its top, in order to prevent mud and other grit from entering and fouling controller 216.

Specifically, cover 250 is preferably made of a one-piece neoprene rubber material that can wrap about controller 216, although any other suitable flexible material can be used, such as a sturdy fabric or the like. It is important that cover 250 be flexible so as to permit movement of pivot bars 232 and 234 and chain cage 214 when cover 250 is wrapped about controller 216. In other words, it is important that cover 250 be made of a rubber or similar material, so as not to hinder the movement of the cage plates 222 and 224, and thereby, not affect the operation of the derailleur.

Cover 250 includes a main body 252 for wrapping around controller 216 to inhibit entry of contaminants to controller 116, and particularly, to the moving parts thereof. Main body 252 is made of a flexible, resilient material, such as neoprene rubber, to enable movement of controller 216 and chain cage 214 in their normal operations.

Although main body 252 will now be discussed as including various walls, it will be appreciated that main body 252 is preferably formed as a unitary, integral structure, and the discussion of the different walls is made only to facilitate understanding of the invention, and in fact, many of the various walls merge into each other. Further, it will be appreciated that the exact placement of the walls can be changed within the scope of the invention as defined by the appended claims.

Main body 252 includes side walls formed by an elongated front wall 254 for covering an outer side of controller 216, opposite elongated end walls 256 and 258 connected at opposite sides of front wall 254 for covering opposite ends of controller 216, an elongated rear wall 259 connected to the rear edge of end wall 258, and a convex bottom wall 261 connecting together lower ends of end walls 256 and 258 and being formed continuously therewith.

Figure 21:
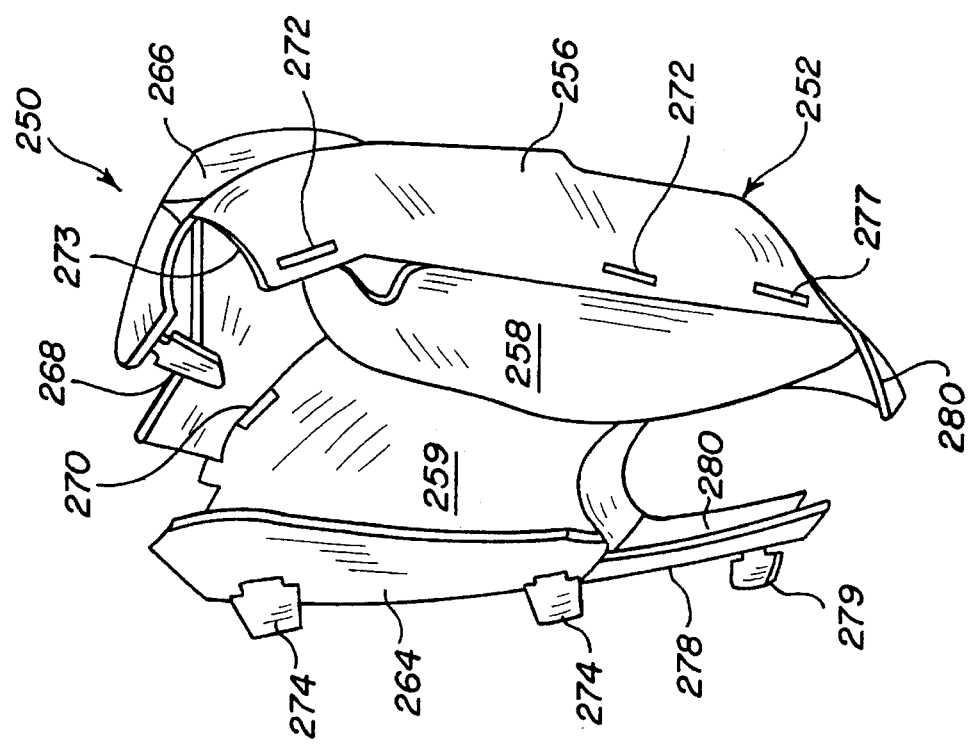
FIG. 21 is a perspective view of the flexible bicycle derailleur cover of FIG. 16, in an open configuration separated from the bicycle derailleur.
Figure 17:
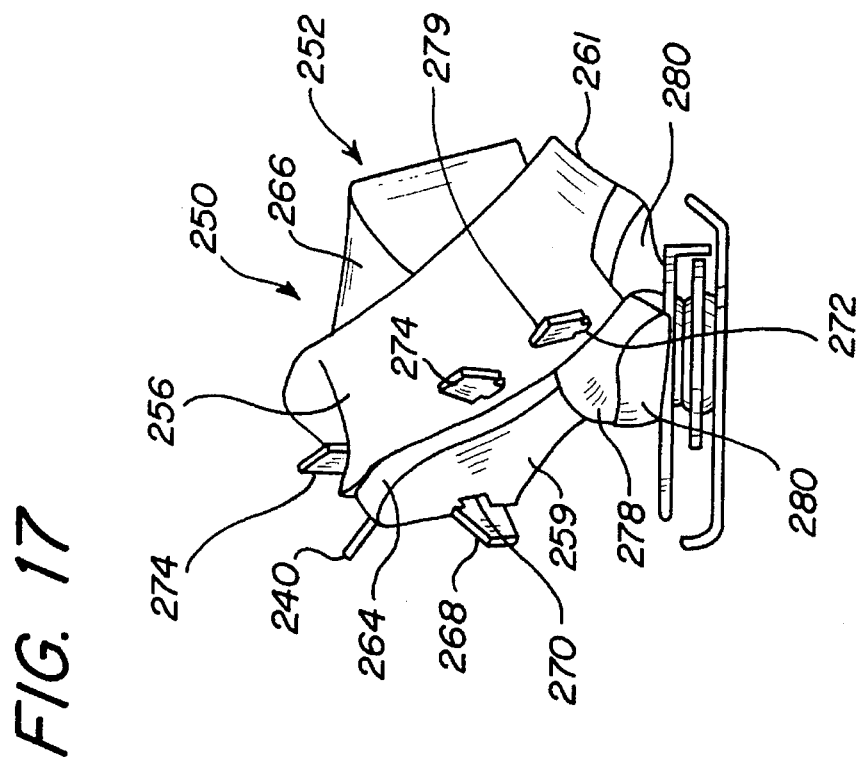
FIG. 17 is a bottom plan view of the flexible bicycle derailleur cover of FIG. 16.
Figure 16:
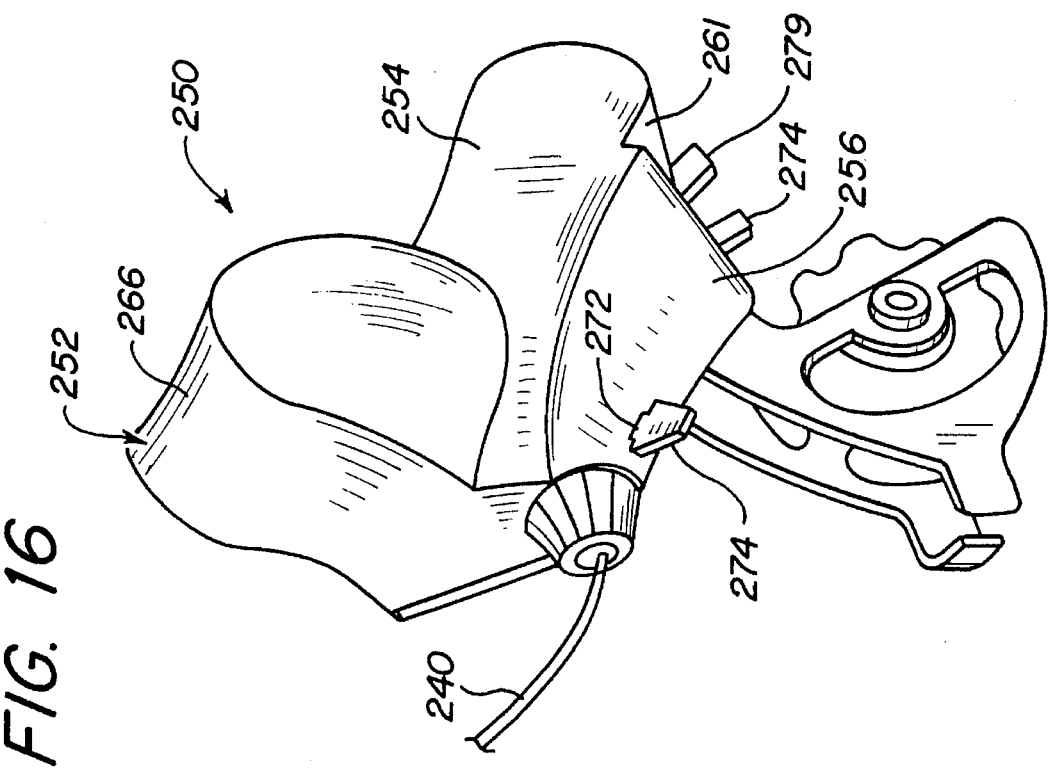
FIG. 16 is a front and left side perspective view of a flexible bicycle derailleur cover according to one embodiment of the present invention, for use with the rear derailleur of FIG. 15.
Figure 18:
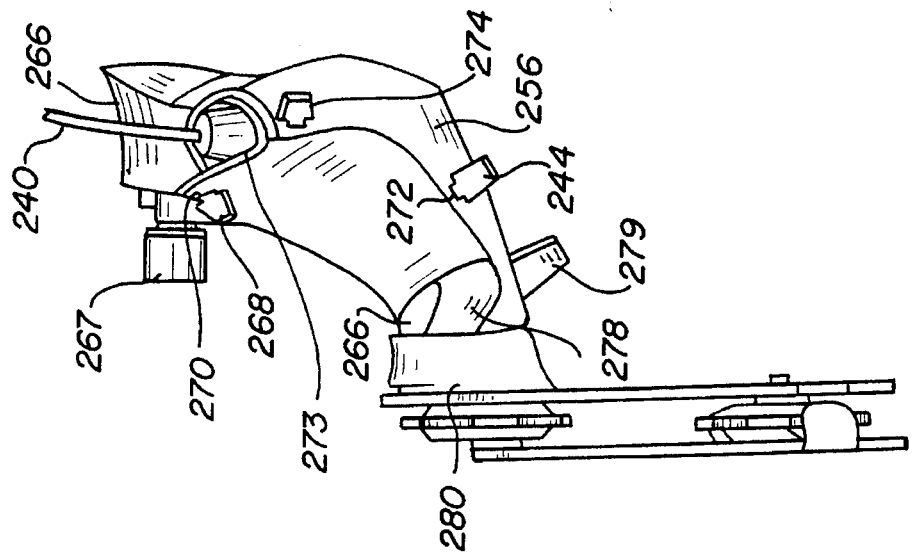
FIG. 18 is right side elevational view of the flexible bicycle derailleur cover of FIG. 16.
Figure 19:
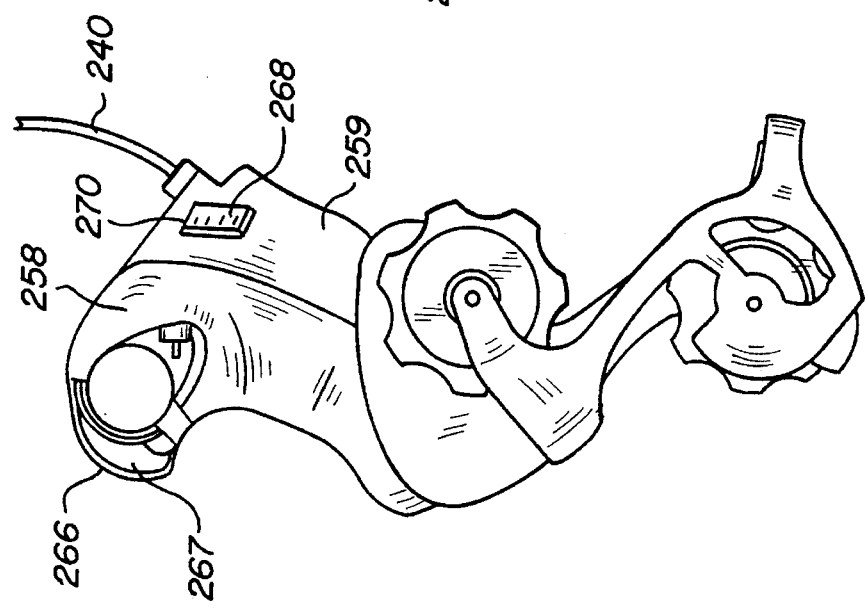
FIG. 19 is a rear elevational view of the flexible bicycle derailleur cover of FIG. 16.
Figure 20:
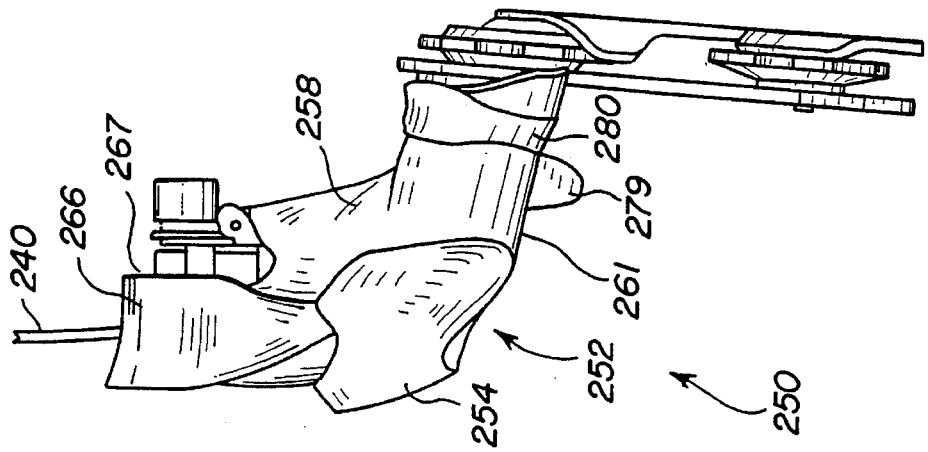
FIG. 20 is a left side elevational view of the flexible bicycle derailleur cover of FIG. 16.

As shown best in FIG. 21, a side flap 264 is secured to rear wall 259, and end wall 256 overlaps side flap 264 in the assembled condition. Side flap 264 includes a plurality of tabs 274 for engagement within slit-like openings 272 in end wall 256 so as to releasably secure main body 252 about controller 216, with tabs 274 and openings 272 forming a controller securing means. Although each tab 274 is shown in the shape of an arrow, any other suitable configuration can be used.

A generally rectangular top wall 260 is secured to the upper edges of end wall 258 and rear wall 259, and seats over clamping head 217 and upper pivot head 230. A slit-like opening 263 is formed at the edge of top wall 260 adjacent to the upper edge of rear wall 259.

A bulbous wall 266 is formed at an upper end of front wall 254 and extends outwardly therefrom in covering relation to clamping head 217 and upper pivot head 230, with bulbous wall 266 being open at the inner side of the bicycle. Bulbous wall 266 is connected to the upper edges of front wall 254 and end wall 258, and also forms a top wall of cover 250. The upper side edge of rear wall 259 is cut-away so as to define, with the inner edge of bulbous wall 266, an opening 267 through which a bolt or the like from clamping head 217 extends for securement to the bicycle. Thus, bulbous wall 266 functions to secure cover 250 to the clamping assembly of rear derailleur 210.

The rear or inner edge of bulbous wall 266 includes a tab 268 for engagement within a slit-like opening 270 at the upper end of rear wall 259 so as to further releasably secure main body 252 about controller 216, with bulbous wall 266, tab 268 and opening 270 forming a main body securing means. Although tab 268 is shown in the shape of an arrow, any other suitable configuration can be used. It will be appreciated that the upper edges of rear wall 259, side flap 264 and end wall 256, together with one edge of bulbous wall 266 define an opening 273 through which cable 240 extends.

A rearward, generally triangular extension 276 is formed at the lower edge of rear wall 259 and a downwardly extending flap 278 is formed along one edge of extension 276 and the lower edge of side flap 264. In the assembled condition, extension 276 seats on top of lower pivot head 231, flap 278 covers one side of lower pivot head 231 and bottom wall 261 overlaps flap 278. In this regard, bottom wall 261 includes a slit-like opening 277 and flap 278 includes a tab 279 for engagement within slit-like opening 277 so as to releasably secure main body 252 about lower pivot head 231 of controller 216. Although tab 279 is shown in the shape of an arrow, any other suitable configuration can be used.

A generally cylindrical shaped lower pivot head covering 280 extends from the inner edges of flap 278, extension 276 and bottom wall 261 to further cover lower pivot head 231. The opposite ends of pivot head covering 280 meet when cover 250 is in the assembled condition.

As a result of this configuration, controller 216 can be received within main body 252 so that main body can be wrapped about controller 216.

Thus, a flexible bicycle derailleur cover 250 is provided for a rear derailleur that substantially prevents the deposit of mud, ice and other grit onto controller 216 of the derailleur so as to maintain controller 216 in a substantially clean condition at all times, thereby inhibiting premature wear of controller 216.

Having described specific preferred embodiments of the invention with reference to the accompanying drawings, it will be appreciated that the present invention is not limited to those precise embodiments and that various changes and modifications can be effected therein by one of ordinary skill in the art without departing from the scope or spirit of the invention as defined by the appended claims.

What is claimed is:

1. A protective cover for a derailleur of a bicycle including a frame and a cable for actuating the derailleur, the derailleur being mounted to the frame and including a cage, controller means for actuating the cage to control movement of the latter and derailleur clamping means for clamping the derailleur to the bicycle frame, with the cable being connected with the controller means of the derailleur for actuating the controller means, said protective cover comprising:

main body means for wrapping around the controller means to inhibit entry of contaminants to the controller means, said main body means being made of a flexible, resilient material, said main body means including:

side walls forming an enclosure for receiving the controller means therein, said side walls being connected together so as to form first and second opposing edges, controller securing means for removably securing together said first and second opposing edges about the controller means so as to permit movement of said controller means, and at least one cable opening means for receiving the cable therethrough for connection with the controller means; and main body securing means for securing said main body means to one of the following:
   the bicycle frame, and
   the derailleur clamping means.

2. A protective cover according to claim 1, wherein the side walls include:
   front wall means for covering an outer side of the controller means,
   opposite end wall means, connected at opposite side edges of said front wall means, for covering opposite ends of the controller means, and
   rear wall means, connected to one side edge of at least one said opposite end wall means, for covering an inner side of the controller means.

3. A protective cover according to claim 2, wherein said main body means further includes top wall means, connected with upper edges of at least one of said front wall means, said end wall means and said rear wall means, for covering a top of said controller means.

4. A protective cover according to claim 3, wherein said rear wall means is formed by opposing first rear flaps connected to rear edges of said opposite end wall means, respectively, and extending inwardly of said main body means, and said controller securing means is connected with at least one of said first rear flaps.

5. A protective cover according to claim 4, wherein said controller securing means includes:
   at least one opening in one of the following:
   one said end wall means,
   and one said first rear flap, and
   tab means in the opposite said first rear flap for engagement within said at least one opening.

6. A protective cover according to claim 4, wherein each said first rear flap is connected to a lower portion of the respective end wall means, and further including a second rear flap connected above one said lower rear flap and to at least one of the following:
   one said end wall means, and
   said top wall,
   and said at least one cable opening means is defined between said second rear flap and the respective said first rear flap.

7. A protective cover according to claim 6, wherein said second rear flap and said first rear flap that define said cable opening means are in at least partially overlapping relation to each other.

8. A protective cover according to claim 4, wherein said main body means further includes first overlapping bottom flaps connecting together bottom edges of each said adjoining end wall and first rear flap.

9. A protective cover according to claim 7, wherein said main body means further includes second bottom flaps extending inwardly of said main body means from a lower edge of each said end wall, and spaced outwardly of said bicycle with respect to said first bottom flaps.

10. A protective cover according to claim 3, wherein said bicycle frame includes a seat tube, and said main body securing means includes:
    an arcuate section for wrapping about the seat tube, the top wall being secured to an outer surface of the arcuate section; and
    arcuate section clamping means for securing the arcuate section about the seat tube.

11. A protective cover according to claim 10, wherein said arcuate section includes a groove therein which is transverse to a longitudinal axis of said seat post, and said arcuate section clamping means includes a clamping strap extending in said groove and wrapping about the seat post to secure the arcuate section to the seat post.

12. A protective cover according to claim 3, wherein said main body means further includes side flap means connected with an opposite side edge of said rear wall means, and said controller securing means is connected with said side flap and the other said end wall means.

13. A protective cover according to claim 12, wherein said controller securing means includes:
    at least one opening in one of the following:
    one said side flap, and
    the other said end wall means, and
    tab means in the other one of said side flap and the other said end wall means for engagement with said at least one opening.

14. A protective cover according to claim 12, wherein:
    said derailleur is a rear derailleur including an upper pivot head, a lower pivot head, first and second pivoting members, each pivotally connected at an upper pivot end to the upper pivot head and at a lower pivot end to the lower pivot head, with the cage being connected with the lower pivot head, and the derailleur clamping means includes a clamping head extending from said upper pivot head,
    said main body securing means including bulbous portion means, connected with said main body means, for removable securement about said clamping head and upper pivot head.

15. A protective cover according to claim 14, wherein said cable opening means is defined between said bulbous portion means and upper edges of said side walls.

16. A protective cover according to claim 15, wherein said bulbous portion means is open at a rear portion thereof to permit securement of said derailleur clamping means to said frame.

17. A protective cover according to claim 14, further including lower pivot head cover means for covering said lower pivot head.

18. A protective cover according to claim 17, wherein said lower pivot head cover means includes an enclosing wall connected with lower edges of said side walls and provided in surrounding relation to said lower pivot head cover means.

19. A protective cover according to claim 2, wherein:

the derailleur is a front derailleur and the controller means thereof includes first and second pivoting members, each pivotally connected at an upper pivot end adjacent the clamping means and pivotally connected to the cage at a lower pivot end thereof, one said pivoting member having an extension, and the cable being connected with the extension for actuating the controller means, and one said end wall means is raised to a greater height than the other said end wall means such that said main body means defines a raised cavity portion adjacent said one raised end wall means for receipt of said extension therein.

20. A protective cover for a front derailleur of a bicycle, the bicycle including a frame and a cable for actuating the derailleur, the front derailleur being mounted to the frame and including a cage, controller means for actuating the cage to control movement of the latter and derailleur clamping means for clamping the derailleur to the bicycle frame, and said controller means including first and second pivoting members, each pivotally connected at an upper pivot end adjacent the clamping means and pivotally connected to the cage at a lower pivot end thereof, one said pivoting member having an extension, and the cable being connected with the extension for actuating the controller means, and said protective cover comprising:
main body means for wrapping around the controller means to inhibit entry of contaminants to the controller means, said main body means being made of a flexible, resilient material, said main body means including:
side walls forming an enclosure for receiving the controller means therein, said side walls being connected together so as to form first and second opposing edges,
controller securing means for removably securing together said first and second opposing edges about the controller means so as to permit movement of said controller means, and
at least one cable opening means for receiving the cable therethrough for connection with the controller means; and main body securing means for securing said main body means to one of the following:
the bicycle frame, and
the derailleur clamping means.

21. A protective cover for a rear derailleur of a bicycle, the bicycle including a frame and a cable for actuating the derailleur, the rear derailleur being mounted to the frame and including a cage, controller means for actuating the cage to control movement of the latter and derailleur clamping means for clamping the derailleur to the bicycle frame, and said controller means including an upper pivot head, a lower pivot head, first and second pivoting members, each pivotally connected at an upper pivot end to the upper pivot head and at a lower pivot end to the lower pivot head, with the cage being connected with the lower pivot head, one said pivoting member having an extension, and the cable being connected with the extension for actuating the controller means, and the derailleur clamping means includes a clamping head extending from said upper pivot head, and said protective cover comprising:
main body means for wrapping around the controller means to inhibit entry of contaminants to the controller means, said main body means being made of a flexible, resilient material, said main body means including:
side walls forming an enclosure for receiving the controller means therein, said side walls being connected together so as to form first and second opposing edges,
controller securing means for removably securing together said first and second opposing edges about the controller means so as to permit movement of said controller means, and
at least one cable opening means for receiving the cable therethrough for connection with the controller means; and main body securing means for securing said main body means to one of the following:
the bicycle frame, and
the derailleur clamping means.

* * * * *